Feb. 27, 1968  A. L. ROSENEL  3,371,192
ELECTRIC AQUARIUM HEATER
Filed Oct. 22, 1965

INVENTOR.
ARTHUR L. ROSENEL
BY
Briskin & Goldfarb
ATTORNEYS

United States Patent Office 3,371,192
Patented Feb. 27, 1968

3,371,192
ELECTRIC AQUARIUM HEATER
Arthur L. Rosenel, 11 5th Ave., New York, N.Y. 10003
Filed Oct. 22, 1965, Ser. No. 500,790
1 Claim. (Cl. 219—523)

ABSTRACT OF THE DISCLOSURE

An aquarium heater comprising a stainless steel casing divided into a pair of hermetically sealed upper and lower chambers by an electrical insulating member. An electric heating coil supported on a porcelain core and surrounded by a filling of magnesia is retained in the lower chamber. The upper chamber houses an adjustable thermostatic heating coil control means supported on the insulating member.

---

This invention relates to an aquarium heater, and more particularly to an aquarium heater provided with a thermostat control and various safety features.

It is an object of the present invention to provide an aquarium heater which is unbreakable, which has a heating element in a compartment isolated electrically from the thermostat so that sparks or the action in one compartment would not affect the action of the element in the other compartment.

Another object of the invention is to provide an aquarium heater which will be sufficiently safe to obtain approval of Underwriters Laboratory.

Another object of the invention is to provide an aquarium heater in which the tendency to formation of sparks when the current is turned on is at a minimum.

To these ends, and in accordance with one feature of the invention, an aquarium heater is provided in which the casing is made in tubular form and of stainless steel. An asbestos divider separates the tubular casing into two compartments. In the lower compartment there is provided the heating element, which comprises a nickel-chromium wire coil wound upon a porcelain core. A layer of pulverulent electrolytic magnesia is provided between the heating element and the walls of the tubular container. The coil is connected to connectors in the asbestos divider. On the other side of the divider, another compartment houses a thermostat which comprises a bi-metallic element mounted on and spaced from a Bakelite plate by means of a retainer element. Near the end of the bimetallic element furthest from the coil there is provided a first electrical contact which is engageable with a second electrical contact mounted opposite the first contact and attached to the Bakelite mounting plate. A condenser is connected in the electrical power line between the source of electricity and the bimetallic element to minimize sparking.

Another feature of the invention is that fasteners and dividing elements are provided which also serve to strengthen the construction and make it more durable.

Still further objects of the invention are to make it simple and inexpensive to manufacture.

These, together with various ancillary objects and features of the invention, which will become apparent as the following description proceeds, are attained by this apparatus for heating an aquarium, a preferred embodiment of the apparatus being illustrated in the accompanying drawing by way of example only, wherein.

In the drawings, the same reference characters are used to designate the same or functionally similar parts throughout the several views.

Figure 1:
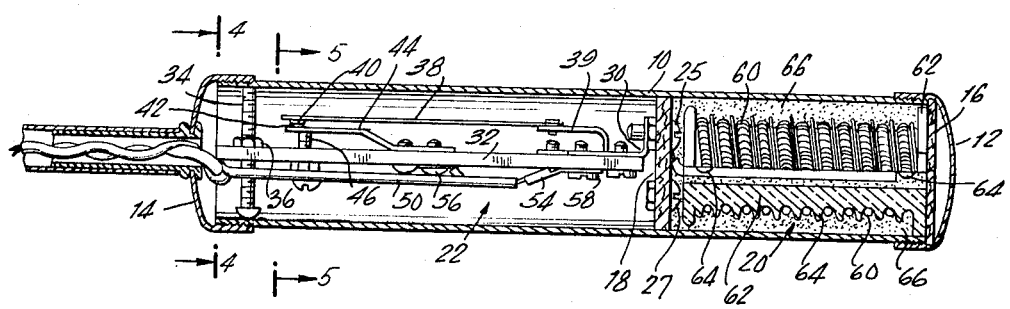
FIG. 1 is a longitudinal cross sectional view of an aquarium heater according to the invention.

The aquarium heater shown in the drawings comprises a metal casing, generally designated by the numeral 10, and having a bottom cap 12 and a top cap 14, each screwed onto the respective ends of the metal casing 10. A disc, preferably of insulating material, is placed between the bottom of the cylindrical casing 10 and the bottom cap 12 for sealing purposes. Intermediate the two ends of the casing 10 and extending across the full cross-section thereof is provided dividing means 18, which serves to divide the metal casing 10 into a plurality of container portions, each hermetically sealed off from the other. One of these container portions encloses a heating coil, generally designated by the numeral 20, and the other of said container portions encloses a thermostat control, generally designated by the numeral 22. The dividing means 18 in the illustrated embodiment is a flat disc of asbestos, which extends across the full cross-section of the metal casing 10. The disc 18 is of sufficient strength and thickness so that it serves as a reinforcing member to strengthen the casing 10 and help prevent crushing thereof.

A plurality of electrical connecting screws or rivets 24, 25, 26 and 27 extend through the dividing member 18 to provide an electrical connection to the heating coil means 20, but still retain the sealed separation between the two compartments of the casing 10. Suspended from screws or rivets 24, 25 are a pair of right-angle brackets 30, which serve to suspend a Bakelite plate 32 at one end thereof relative to the dividing member 18. The other end of the plate 32 is fixed relative to the walls of the container 10 by means of a transverse screw 34 extending through the plate 32 and having a locking nut 36 mounted thereon against the plate 32.

A bi-metal strip 38, having the property of bending when its temperature is changed, is fastened at one end thereof by a bent retainer means onto the Bakelite plate 32 in a position spaced from the plate. Adjacent the other end of the strip 38 is a first electrical contact 40 fixed to the strip 38. A second electrical contact 42, engageable with the first contact 40, is mounted by means of a contact holder 44 in a position opposite the first contact 40, the holder 44 being fixed to the Bakelite plate 32 and being provided with an adjusting screw 46 which serves to move the free end of the contact holder 44, and thus the contact 46 mounted thereon, toward or away from the contact 40 which is mounted on the strip 38.

Figure 2:
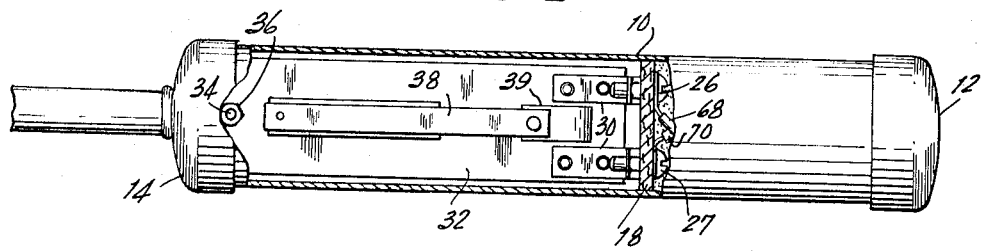
FIG. 2 is a side view of the device of FIG. 1, partially cut away.

A pair of electrical lead lines 48, 50, adapted to be connected at one end thereof to a source of electrical power (not shown), have end connectors 52, 54, respectively, mounted at their other ends and connected by means of screws 56 and 58, both extending through the plate 32 to the metallic brackets 30 for transmission of electrical power, by means of the screws 24, 25 to the nickel-chromium wire 60 of the heating coil 20. The nickel-chromium wire 60 is wound about a porcelain core 62, which is formed with spiral recess means 64 in its surface. The nickel-chromium wire 60 is wound around the porcelain core 62 and nests within the spiral recess 64, which prevents it from shifting out of position. A layer of pulverulent electrolytic magnesia 66, that is, chemically pure magnesia produced by electrolysis, between the heating coil means 20, especially between the wire 60 thereof, and the wall of the container 10. This serves to rapidly transmit heat from the wire 60 to the wall of the container 10. As best shown in FIG. 2, the ends of the heating wire 60 are connected by means of leads 68, 70 to the respective connector screws 26, 27.

Figure 3:
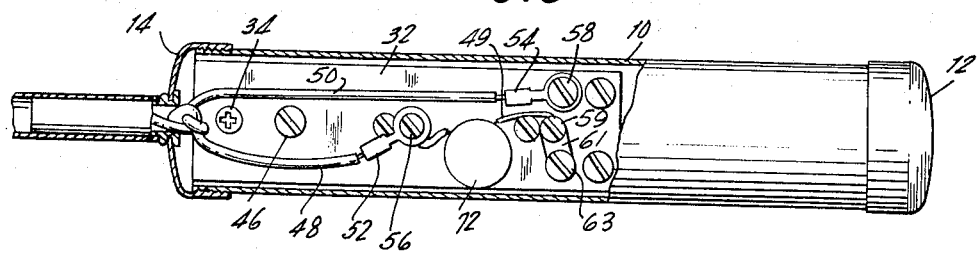
FIG. 3 is a rear view of the device of FIG. 1, partially cut away.
Figure 4:
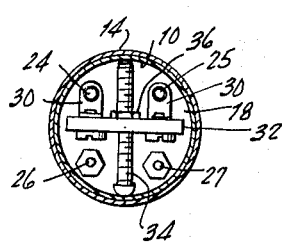
FIG. 4 is a cross sectional view taken along line 4—4 of FIG. 1.
Figure 5:
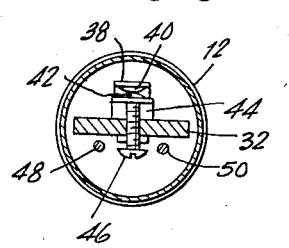
FIG. 5 is a cross sectional view taken along line 5—5 of FIG. 1.

A condenser 72 is connected into the electrical power line leading to the coil 20 from the contacts 40, 42. As best shown in FIGURE 3, the screw 56 which mounts the metallic holder 44 to the plate 32 serves as an electrical connector for current from the wire 48 to the holder 44, from whence the current flows to contact 42. When this second contact 42 is in electrical contact with the contact 40, current flows along the bi-metal strip 38, through the bent holder 39 to the screw 59, one of the pair of screws which fixes the bent holder 39 onto the plate 32. By means of a metal strip 61 fastened between the screws 59 and 63, the current is then transferred to one of the brackets 30, which leads electrically to the screw 26, where the heating coil wire 60 is connected. The condenser 72 is connected, as shown in FIG. 3, between the screw 56, connected to the electrical contact 42, and the screw 59, connected to the holder 39.

The portion of the container 10 which contains the heating element 20 is preferably made heavier in weight as compared to the container portion which contains the thermostat 22, so that the heating element 20 will tend to always be directed downwardly when hung in the aquarium. The casing 10 is preferably made of stainless steel to prevent corrosion and help maintain the container sealed against the water or other surrounding liquid into which it may be placed. The electrical cord 48, 50 which extends through the cap 14 to a source of electrical power passes through a plastic tube which is sealed by means of a collar into the end of the cap 14.

It will be obvious to those skilled in the art, upon a study of this disclosure, that this invention permits of various modifications and alterations with respect to the individual components and arrangements disclosed, and hence can be embodied in apparatus other than as particularly illustrated and described herein, without departing from the essential features of the invention and within the spirit and scope of the claim annexed hereto.

I claim:

1. An aquarium heater comprising a casing, means dividing said casing into a plurality of hermetically sealed container portions, heating coil means in one of said container portions, thermostat means disposed in another of said container portions, and electrical connecting means extending through said dividing means for electrically connecting said heating coil means with said thermostat means for controlling said heating coil means, said dividing means being an electrical insulation member extending across the full cross section of said metal casing and physically supporting said thermostat means, said heating coil means comprising a porcelain core having spiral recess means in its surface, a coil of resistance wire wound about said core and nesting in said recess means, electrical conduit means connected from said coil to said electrical connecting means, and a layer of pulverulent insulating material between said heating coil means and said casing for transferring heat directly from said coil to said casing and for rendering said container portion with said heating coil means heavier in weight than said other container portion with said thermostat means, said thermostat means comprising a plate of electrically insulating material supported by said electrical insulation member, a bi-metal strip having a first contact thereon adjacent on end thereof, bent retainer means mounting said strip onto said plate in a position spaced therefrom, a second contact engageable with said first contact and having contact holder means mounting said second contact into position opposite said first contact, adjusting means for altering the position of said second contact toward and away from said first contact, said adjusting means also carried on said plate of electrically insulating material, electrical conduit means for connecting said retainer means to a source of electrical power, and condenser means within said other container portion connected in said electrical conduit means between said source of power and said retainer means.

References Cited

UNITED STATES PATENTS

| 1,689,198 | 10/1928 | Gagelman | 219—331 |
| 1,750,907 | 3/1930 | Skold | 219—523 X |
| 1,837,000 | 12/1931 | Wertz | 219—323 X |
| 2,699,488 | 1/1955 | Arak et al. | 219—328 |
| 2,784,292 | 3/1957 | Haloski | 219—523 X |
| 2,811,629 | 10/1957 | Danner | 219—523 |

FOREIGN PATENTS

| 578,950 | 7/1924 | France. |
| 1,046,410 | 7/1953 | France. |
| 800,177 | 10/1950 | Germany. |

ANTHONY BARTIS, *Primary Examiner.*